United States Patent
Sato et al.

(10) Patent No.: US 11,981,053 B2
(45) Date of Patent: May 14, 2024

(54) COMPRESSION MOLDING DEVICE

(71) Applicants: NIPPON CLOSURES CO., LTD., Tokyo (JP); Toyo Seikan Group Engineering Co., Ltd., Kanagawa (JP)

(72) Inventors: Akio Sato, Tokyo (JP); Yoshihiro Kaitsuka, Kanagawa (JP); Shin Nakamura, Kanagawa (JP); Keitaro Hayashi, Kanagawa (JP); Hiroshi Takahashi, Kanagawa (JP); Mitsuo Kumata, Kanagawa (JP); Yukihito Nozaki, Kanagawa (JP); Tomoho Kikuchi, Kanagawa (JP); Kunihiko Hatazawa, Kanagawa (JP)

(73) Assignees: NIPPON CLOSURES CO., LTD., Tokyo (JP); TOYO SEIKAN GROUP ENGINEERING CO., LTD., Kanagawa (JP)

( * ) Notice: Subject to any disclaimer, the term of this patent is extended or adjusted under 35 U.S.C. 154(b) by 399 days.

(21) Appl. No.: 17/413,293

(22) PCT Filed: Dec. 9, 2019

(86) PCT No.: PCT/JP2019/048043
§ 371 (c)(1),
(2) Date: Jun. 11, 2021

(87) PCT Pub. No.: WO2020/122002
PCT Pub. Date: Jun. 18, 2020

(65) Prior Publication Data
US 2022/0063141 A1 Mar. 3, 2022

(30) Foreign Application Priority Data
Dec. 12, 2018 (JP) ................................. 2018-232116

(51) Int. Cl.
*B29C 33/24* (2006.01)
*B29C 43/08* (2006.01)
(Continued)

(52) U.S. Cl.
CPC .............. *B29C 33/24* (2013.01); *B29C 43/08* (2013.01); *B29C 2043/3283* (2013.01); *B29C 2043/3694* (2013.01)

(58) Field of Classification Search
CPC ............................... B29C 33/24; B29C 43/08
See application file for complete search history.

(56) References Cited

U.S. PATENT DOCUMENTS 1,202,644 A * 10/1916 Avram .................... B29C 43/34
100/906
2,202,797 A * 5/1940 Hoge .................... B29C 31/066
425/436 R
(Continued)

FOREIGN PATENT DOCUMENTS

| JP | 58-107260 | 6/1983 |
| JP | 2-165900 | 6/1990 |

(Continued)

OTHER PUBLICATIONS

International Search Report dated Jan. 28, 2020 in International (PCT) Application No. PCT/JP2019/048043.
(Continued)

*Primary Examiner* — Galen H Hauth
(74) *Attorney, Agent, or Firm* — Wenderoth, Lind & Ponack, L.L.P.

(57) ABSTRACT

A compression molding device, which can obtain a high compression molding force without lowering the efficiency of article production, and whose molding means has a long service life, is provided. In the compression molding device, a one-side mold assembly moving means (58) includes a
(Continued)

toggle link mechanism including two links (62) and (64), and a toggle link mechanism operating means (60), while an opposite-side mold assembly moving means (108) includes a hydraulic cylinder mechanism. When a one-side mold assembly (16) and an opposite-side mold assembly (18) are to be brought from an open state into a closed state, the one-side mold assembly (16) is first moved to a nearly closed state by the one-side mold assembly moving means (58), and then the opposite-side mold assembly (18) is moved from the nearly closed state to the closed state by the opposite-side mold assembly moving means (108).

6 Claims, 6 Drawing Sheets

(51) Int. Cl.
*B29C 43/32* (2006.01)
*B29C 43/36* (2006.01)

(56) References Cited

U.S. PATENT DOCUMENTS

| | | | |
|---|---|---|---|
| 3,015,843 | A | 1/1962 | Gora |
| 4,729,300 | A | 3/1988 | Klein |
| 5,989,007 | A * | 11/1999 | Ingram .................. B29C 43/58 |
| | | | 425/149 |
| 2003/0080448 | A1 | 5/2003 | Nishimoto et al. |

FOREIGN PATENT DOCUMENTS

| | | |
|---|---|---|
| JP | 2000-084965 | 3/2000 |
| JP | 2007-203360 | 8/2007 |
| WO | 2015/079392 | 6/2015 |

OTHER PUBLICATIONS

First Office Action dated Nov. 1, 2022 in corresponding Chinese Patent Application No. 201980072357.1, with English translation.
Extended European Search Report dated Aug. 4, 2022 in corresponding European Patent Application No. 19896817.4.

* cited by examiner (a)   (b)

COMPRESSION MOLDING DEVICE

TECHNICAL FIELD

This invention relates to a compression molding device. More specifically, the invention relates to, but not limited to, a compression molding device suitable for molding, especially, a container lid or an article similar to it.

BACKGROUND ART

As a container lid to be applied to a container for containing a beverage or the like, a container lid, which includes a top panel wall, and a skirt wall extending downwardly from the outer peripheral edge of the top panel wall, and in which the skirt wall has an inner peripheral surface formed with an internal thread to be screwed to an external thread formed on a mouth-neck section of the container, is widely put to practical use. Such a container lid is formed by compression-molding a suitable synthetic resin material.

As an example of a device for compression-molding an article such as the above-described synthetic resin container lid, Patent Document 1 shown below discloses a compression molding device including a molding means composed of a one-side mold assembly and an opposite-side mold assembly, wherein the one-side mold assembly and the opposite-side mold assembly are free to move toward and away from each other between a closed state where they collaboratively compression-mold an article, and an open state where they are located apart from each other; a one-side mold assembly moving means is attached to the one-side mold assembly; and an opposite-side mold assembly moving means is attached to the opposite-side mold assembly.

PRIOR ART DOCUMENTS

Patent Documents

Patent Document 1: JP-A-2000-84965

SUMMARY OF THE INVENTION

Problems to be Solved by the Invention

In recent times, it has been demanded from aspects such as environmental friendliness and cost reduction that a thin-walled lightweight synthetic resin article be compression-molded. A high compression molding force is required for fulfilling this demand. However, the one-side mold assembly moving means and the opposite-side mold assembly moving means of the compression molding device disclosed in Patent Document 1 are each constituted by a cam mechanism. Thus, an increase in the compression molding force will directly impose a heavy load on the cam mechanism. As a result, a member constituting a part of the cam mechanism, such as a cam groove or a cam roller, may be partly worn or damaged. Such a problem has made it difficult to set a high compression molding force for the compression molding device disclosed in Patent Document 1. It is conceivable to constitute each of the one-side mold assembly moving means and the opposite-side mold assembly moving means by use of a hydraulic cylinder mechanism in order to obtain a greater compression molding force than the compression molding force obtained by the cam mechanism. In this case, however, the motions of the hydraulic cylinder mechanism are much slower than the motions of the cam mechanism, thus considerably lowering the efficiency of article production. A large-scale hydraulic system, if provided, can speed up the motions of the hydraulic cylinder mechanism, but this is not realistic from the point of view of energy consumption. On the other hand, one of the one-side mold assembly moving means and the opposite-side mold assembly moving means may be constituted by a cam mechanism, and the other moving means may be constituted by a hydraulic cylinder mechanism, in an attempt to obtain a great compression molding force while minimizing a decrease in the efficiency of article production. In this case, however, the cam mechanism and the hydraulic cylinder mechanism are located on the same straight line, so that the compression molding force from the hydraulic cylinder mechanism is transmitted to the cam mechanism via the opposite-side mold assembly and the one-side mold assembly. In this case as well, a considerably heavy load will be imposed on the cam mechanism during compression molding. Consequently, a member constituting a part of the cam mechanism, such as a cam groove or a cam roller, may be worn early or damaged. From such a cause or the like, the required high compression molding force may fail to be obtained, or the service life of the moving means may be shortened.

The present invention has been accomplished in the light of the above facts. Its principal technical challenge is to provide a novel and improved compression molding device which can continuously obtain a required high compression molding force without lowering the efficiency of article production during repeated compression molding, and which imparts a long service life to the moving means.

Means for Solving the Problems

Upon in-depth studies, the present inventors have found that the above-described principal technical challenge can be solved by taking the following measures: A one-side mold assembly moving means includes a toggle link mechanism including two links, and a toggle link mechanism operating means. An opposite-side mold assembly moving means includes a hydraulic cylinder mechanism. When a one-side mold assembly and an opposite-side mold assembly are to be brought from an open state into a closed state, the one-side mold assembly is first moved to a nearly closed state by the one-side mold assembly moving means. Then, the opposite-side mold assembly is moved from the nearly closed state to the closed state by the opposite-side mold assembly moving means.

That is, according to the present invention, there is provided, as a compression molding device for solving the above principal technical challenge, a compression molding device comprising a molding means composed of a one-side mold assembly and an opposite-side mold assembly, the one-side mold assembly and the opposite-side mold assembly being free to move toward and away from each other between a closed state where they collaboratively compression-mold an article, and an open state where they are located apart from each other; the one-side mold assembly having a one-side mold assembly moving means attached thereto; and the opposite-side mold assembly having an opposite-side mold assembly moving means attached thereto, wherein the one-side mold assembly moving means includes a toggle link mechanism including two links, and a toggle link mechanism operating means, the opposite-side mold assembly moving means includes a hydraulic cylinder mechanism, when the one-side mold assembly and the opposite-side mold assembly are to be brought from the open state into the closed state, the one-side mold assembly is first moved toward the opposite-side mold assembly by the one-side mold assembly moving means, whereby the one-side mold assembly and the opposite-side mold assembly are brought close to a state proximate to the closed state to establish a nearly closed state, so that the two links constituting the toggle link mechanism in the one-side mold assembly moving means are located on a straight line, and the opposite-side mold assembly is then moved toward the one-side mold assembly by the opposite-side mold assembly moving means to establish the closed state, whereupon a compression molding force exerted by the opposite-side mold assembly moving means is transmitted to the toggle link mechanism via the opposite-side mold assembly and the one-side mold assembly, but is not transmitted to the toggle link mechanism operating means.

Preferably, the moving distance of the one-side mold assembly imparted by the one-side mold assembly moving means is greater than the moving distance of the opposite-side mold assembly imparted by the opposite-side mold assembly moving means. It is preferred that the compression molding device be equipped with a rotating support to be rotationally driven, and a plurality of the molding means be mounted on the rotating support at circumferential intervals. In this case, the toggle link mechanism operating means is desirably composed of a cam following link mechanism having a cam follower at one end and has the other end connected to the toggle link mechanism; and a stationary cam collaborating with the cam following link mechanism. In the nearly closed state and the closed state, moreover, it is preferred that a plurality of links constituting the cam following link mechanism be located in line, and the two links constituting the toggle link mechanism and located in line and the plurality of links located in line in the cam following link mechanism deviate from each other. Advantageously, the rotating support is rotationally driven about a central axis extending vertically, and the one-side mold assembly and the opposite-side mold assembly are free to move in a vertical direction.

Effects of the Invention

According to the compression molding device of the present invention, when the one-side mold assembly and the opposite-side mold assembly are to be brought from the open state into the closed state, the one-side mold assembly is first moved toward the opposite-side mold assembly by the one-side mold assembly moving means to establish the nearly closed state. Then, the opposite-side mold assembly is moved toward the one-side mold assembly by the opposite-side mold assembly moving means to establish the closed state. The one-side mold assembly moving means includes the toggle link mechanism, and the one-side mold assembly is moved by the toggle link mechanism. Thus, the one-side mold assembly can be promptly moved from the open state to the nearly closed state. On the other hand, the opposite-side mold assembly moving means includes the hydraulic cylinder mechanism, and the opposite-side mold assembly is moved by the hydraulic cylinder mechanism. When the opposite-side mold assembly moves to establish the closed state from the nearly closed state, therefore, a strong compression molding force can be generated. Hence, the compression molding device of the present invention makes it possible to obtain a great compression molding force without lowering the efficiency of article production. According to the compression molding device of the present invention, moreover, in the nearly closed state and the closed state, the two links constituting the toggle link mechanism are located in line, so that the toggle link mechanism and the toggle link mechanism operating means are not located on the same straight line. Thus, the great compression molding force exerted by the opposite-side mold assembly moving means is transmitted to the toggle link mechanism via the opposite-side mold assembly and the one-side mold assembly, but is not transmitted to the toggle link mechanism operating means. Consequently, the service life of the moving means can be lengthened.

BRIEF DESCRIPTION OF THE DRAWINGS

FIGS. 4-1(a), 4-1(b) are views showing the process of compression molding by the one-side mold assembly and the opposite-side mold assembly shown in FIG. 3.

FIGS. 4-2(c), 4-2(d) are views showing the process of compression molding by the one-side mold assembly and the opposite-side mold assembly shown in FIG. 3.

FIGS. 4-3(e), 4-3(f) are views showing the process of compression molding by the one-side mold assembly and the opposite-side mold assembly shown in FIG. 3.

MODE FOR CARRYING OUT THE INVENTION

A preferred embodiment of a compression molding device configured in accordance with the present invention will be described below by reference to the accompanying drawings.

Figure 1:
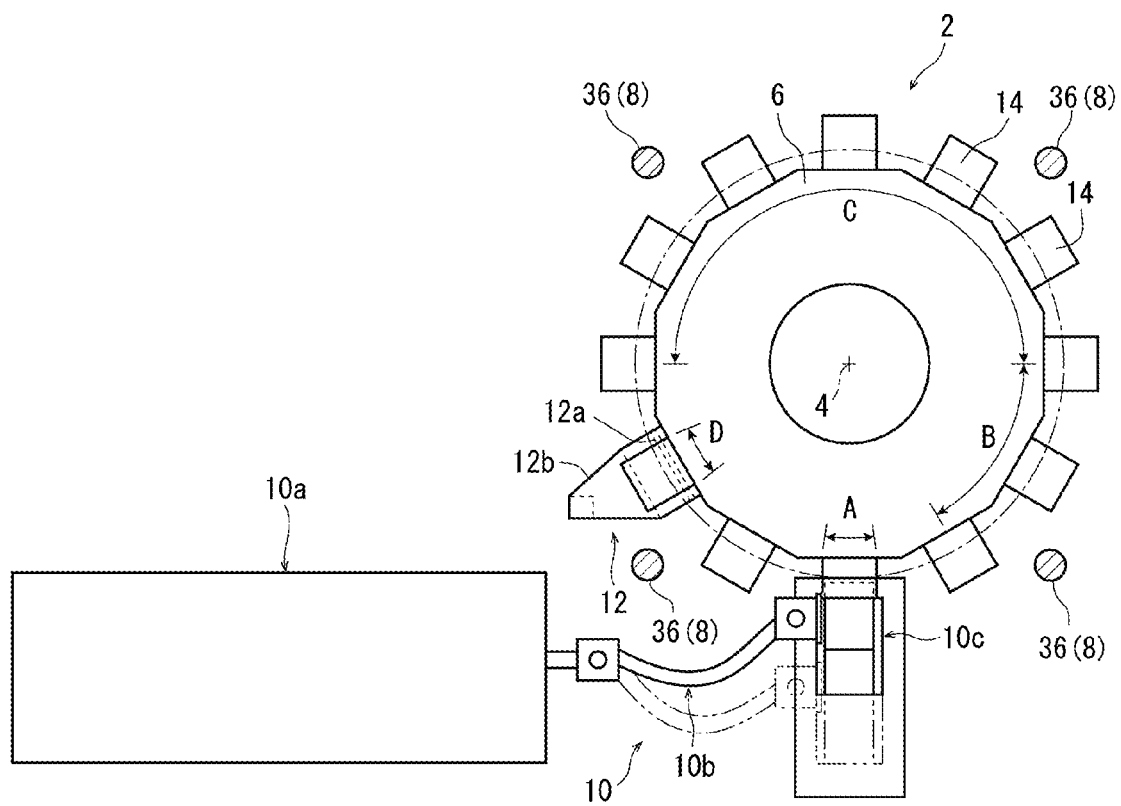
FIG. 1 is a plan view schematically showing an embodiment of a compression molding device for a synthetic resin article which has been configured in accordance with the present invention.

With reference to FIG. 1, a compression molding device entirely indicated at 2 comprises a rotating support 6 which is rotationally driven by a suitable drive source, such as an electric motor, counterclockwise in FIG. 1 at a predetermined speed about a central axis 4 extending substantially vertically, a stationary frame body 8 (see FIG. 2 as well) surrounding the rotating support 6, a synthetic resin material support means 10, and a molded article carry-out means 12. The rotating support 6 is mounted with a plurality of molding means 14 spaced at circumferential equiangular intervals. Each of the molding means 14, as will be described in detail later, is composed of a one-side mold assembly 16 and an opposite-side mold assembly 18, and is opened and closed vertically as required while being moved in a circular transport path in accordance with the rotation of the rotating support 6.

When the molding means 14 lies in a synthetic resin material supply region denoted by a symbol A, a synthetic resin material 110 is supplied from the synthetic resin material supply means 10 into the molding means 14 placed in an open state to be described later (see FIG. 4-1(a) as well). The synthetic resin material supply means 10 is equipped with an extruder 10a, a conduit means 10b, and a die head 10c. The synthetic resin material 110 in a hot molten state extruded from the extruder 10a is supplied to the die head 10c through the conduit means 10b, and extruded through an extrusion opening (not shown) provided in the die head 10c. A cutting means (not shown) is provided in association with the extrusion opening of the die head 10c. The synthetic resin material 110 extruded through the extrusion opening is cut by the cutting means, and supplied to the molding means 14. Then, the molding means 14 is closed, as will be described later, while the molding means 14 is passing through a molding region denoted by a symbol B, whereby the synthetic resin material 110 is compression-molded into a molded article of a required shape. During passage of the molding means 14 through a cooling region denoted by a symbol C, the molding means 14 is maintained in a closed state to be described later, so that the compression-molded article is cooled. While the molding means 14 is moving from the downstream end of the cooling region C toward a molded article carry-out region denoted by a symbol D, the molding means 14 is gradually opened. In the molded article carry-out region D, the molded article is discharged from the molding means 14 by the molded article carry-out means 12. The molded article carry-out means 12 is provided with an air ejection pipe 12a extending along the radially inward side of the travel path of a molded synthetic resin container lid 112 (also see FIGS. 4-3(e), 4-3(f)), and a carry-out chute 12b disposed below the travel path. The above-mentioned synthetic resin material supply means 10 and molded article carry-out means 12 may themselves be of well-known configurations, and their detailed explanations will be omitted herein.

Figure 2:
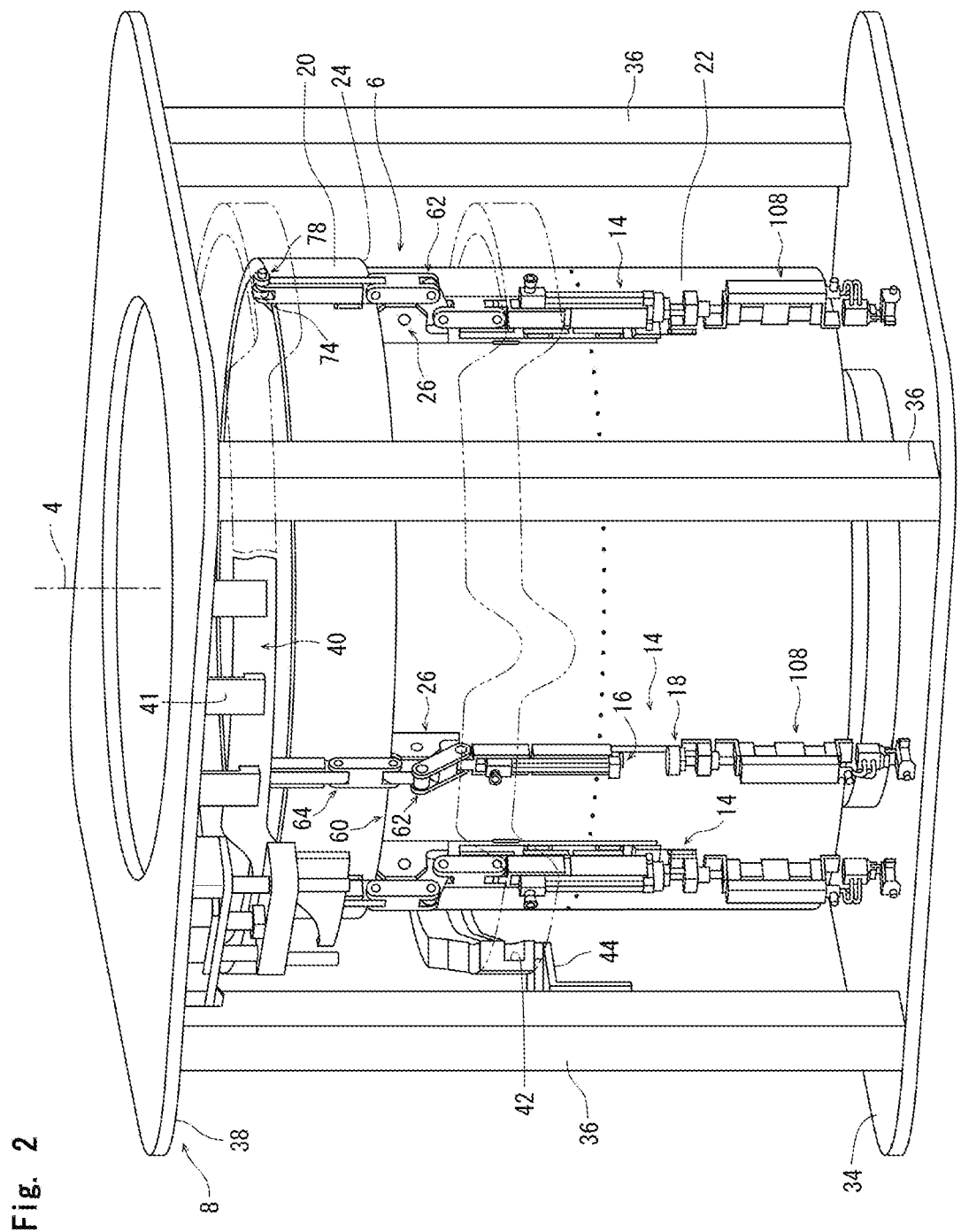
FIG. 2 is a partially simplified perspective view of a rotating support of the compression molding device shown in FIG. 1, and constituent parts accessory thereto.
Figure 3:
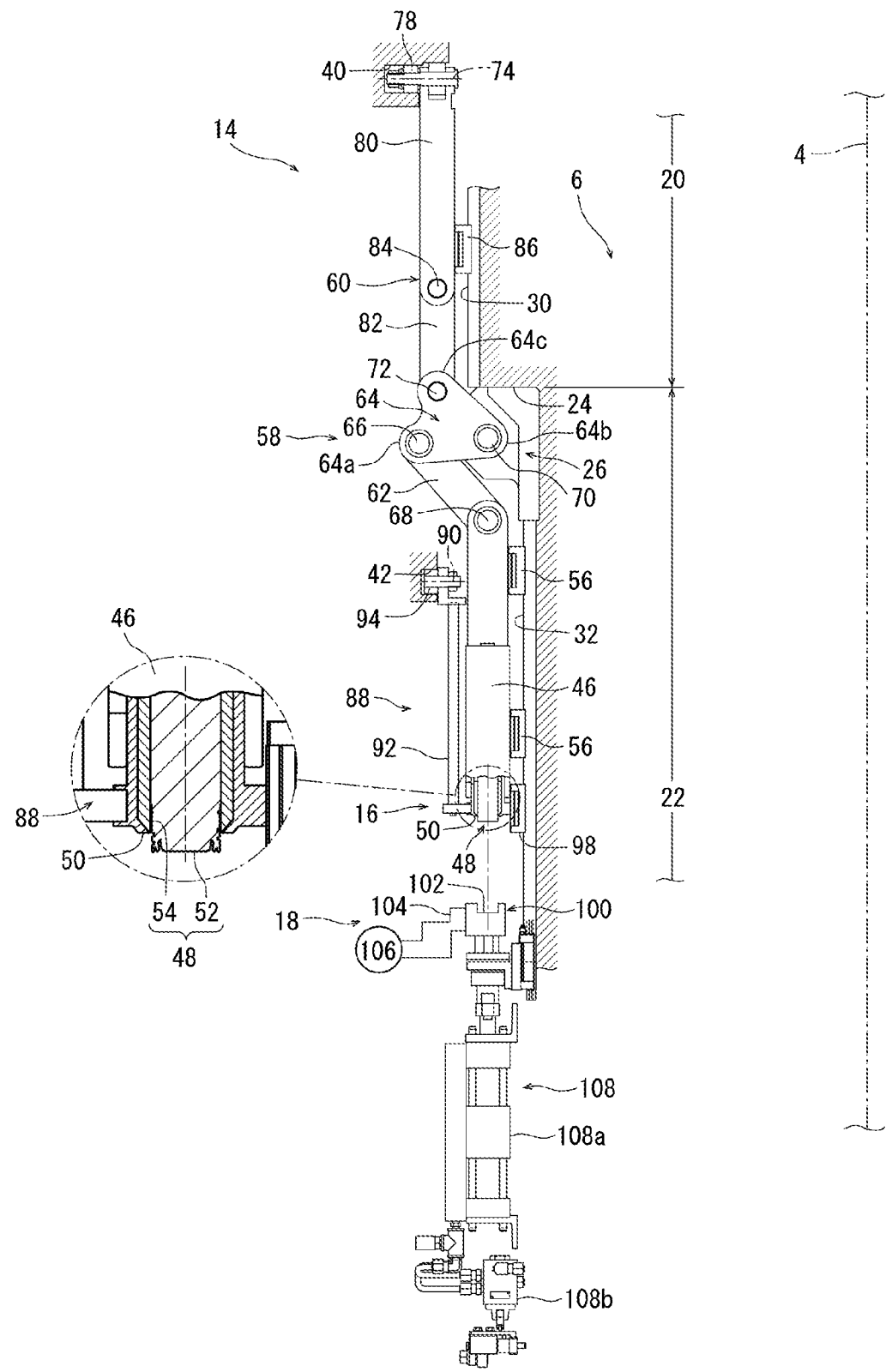
FIG. 3 is a longitudinal sectional view of a one-side mold assembly and an opposite-side mold assembly provided in the compression molding device shown in FIG. 1.

Referring to FIGS. 2 and 3, the rotating support 6 is in a tubular shape assuming the form of a regular n-sided polygon the number of whose sides is the same as the number n of the molding means 14 mounted on the rotating support 6, and has an upper portion 20 of a larger diameter and a lower portion 22 of a smaller diameter (n is a natural number, and FIG. 1 is represented as n=12, but this is merely intended to show the rotating support 6 schematically). As will be clearly understood by referring to FIG. 3, in its longitudinal sectional view, the outer peripheral surfaces of the upper portion 20 and the lower portion 22 both extend vertically in parallel with the central axis 4, and a shoulder lower surface 24 perpendicular to each of the upper portion 20 and the lower portion 22 and facing downward is provided between the upper portion 20 and the lower portion 22. A relay member 26 provided with a fixed joint 70 to be described later is secured to an upper end part of each of the side surfaces of the lower portion 22 (the relay member 26 is also secured to the shoulder lower surface 24). A rail 30 extending vertically rectilinearly is attached to each side surface of the upper portion 20. To each side surface of the lower portion 22 as well, a rail 32 extending vertically rectilinearly is attached, except at a part where the relay member 26 is secured.

By reference to FIG. 2, the stationary frame body 8 has a lower base block 34 for supporting the rotating support 6, a plurality of struts 36 spaced at circumferential intervals outside the rotating support 6 and extending upwardly rectilinearly from the lower base block 34 along the central axis 4, and an upper base block 38 located above the rotating support 6 and supported by the struts 36 in parallel with the lower base block 34. A stationary cam 40 for operating the one-side mold assembly 16 vertically as a whole is supported by the upper base block 38 (and upper end parts of the struts 36) via support tools 41. At an intermediate part, as viewed vertically, of the strut 36, a stripper-operating stationary cam 42 for operating a stripper 50 (to be described later) vertically with respect to a core 48 is supported by a support tool 44. As will be understood by referring to FIG. 3 along with FIG. 2, the stationary cams 40 and 42 are each a rail groove of a U-shaped cross section opened diametrically inwardly. Inside the rail grooves, cam rollers 78, 94 to be described later are disposed respectively, and they are vertically displaced, as appropriate, at circumferentially predetermined angular positions so that the one-side mold assembly 16 and the stripper 50 will be vertically moved as required when the cam rollers 78, 94 move in the circumferential direction. The operation of the one-side mold assembly 16 by the stationary cam 40 and the operation of the stripper 50 by the stationary cam 42 will be mentioned later.

Next, the molding means 14 will be described. Each of the molding means 14 mounted on the rotating support 6 has substantially the same configuration. Thus, only one of the molding means 14 will be described below. In FIG. 2, many of the molding means 14 mounted on the rotating support 6 are omitted from the illustration so that the entire configuration will be easily understandable. The molding means 14 is composed of the one-side mold assembly 16 and the opposite-side mold assembly 18, and the one-side mold assembly 16 and the opposite-side mold assembly 18 face and collaborate with each other. In the illustrated embodiment, the one-side mold assembly 16 is located above, while the opposite-side mold assembly 18 is located below.

Referring mainly to FIG. 3, the one-side mold assembly 16 has a casing 46 of a vertically extending tubular shape. The casing 46 accommodates the core 48 which constitutes a male mold during compression molding, and the stripper 50 which removes a compression-molded article from the core 48. The lower end of the casing 46 is open, and lower end parts of the core 48 and the stripper 50 protrude downward from the lower end of the casing 46. The core 48 is further composed of an inner core 52 assuming the shape of a solid rod and having a lower end part corresponding to the required shape of the article, and an outer core 54 of a tubular shape surrounding the outer peripheral surface of the inner core 52. When viewed in the vertical direction, the lower end position of the inner core 52 is below the lower end position of the outer core 54. The stripper 50 is a tubular member surrounding the outer peripheral surface of the core 48. The core 48 acts integrally with the casing 46, while the stripper 50 is vertically movable with respect to the casing 46 (accordingly, with respect to the core 48). In connection with these actions, a description will be presented later. Onto the outer peripheral surface of the casing 46, two casing guides 56 collaborating with the rail 32 attached to the lower portion 22 of the rotating support 6 are secured at vertically spaced points. The casing guide 56 grips the rail 32, and is vertically movable along the rail 32, but its diametrical movement is restrained. Thus, the one-side mold assembly 16 becomes movable only in the vertical direction while maintaining its posture along the central axis 4.

Figures 1, 4:
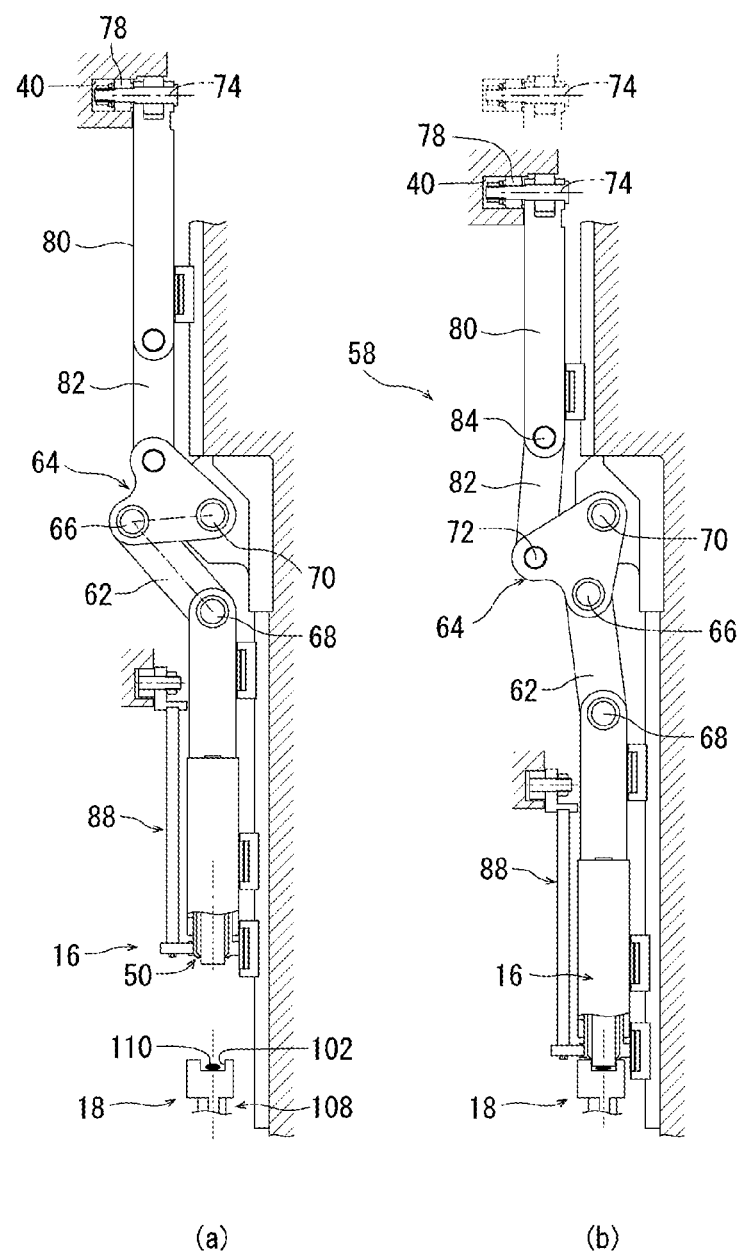
Figures 2, 4:
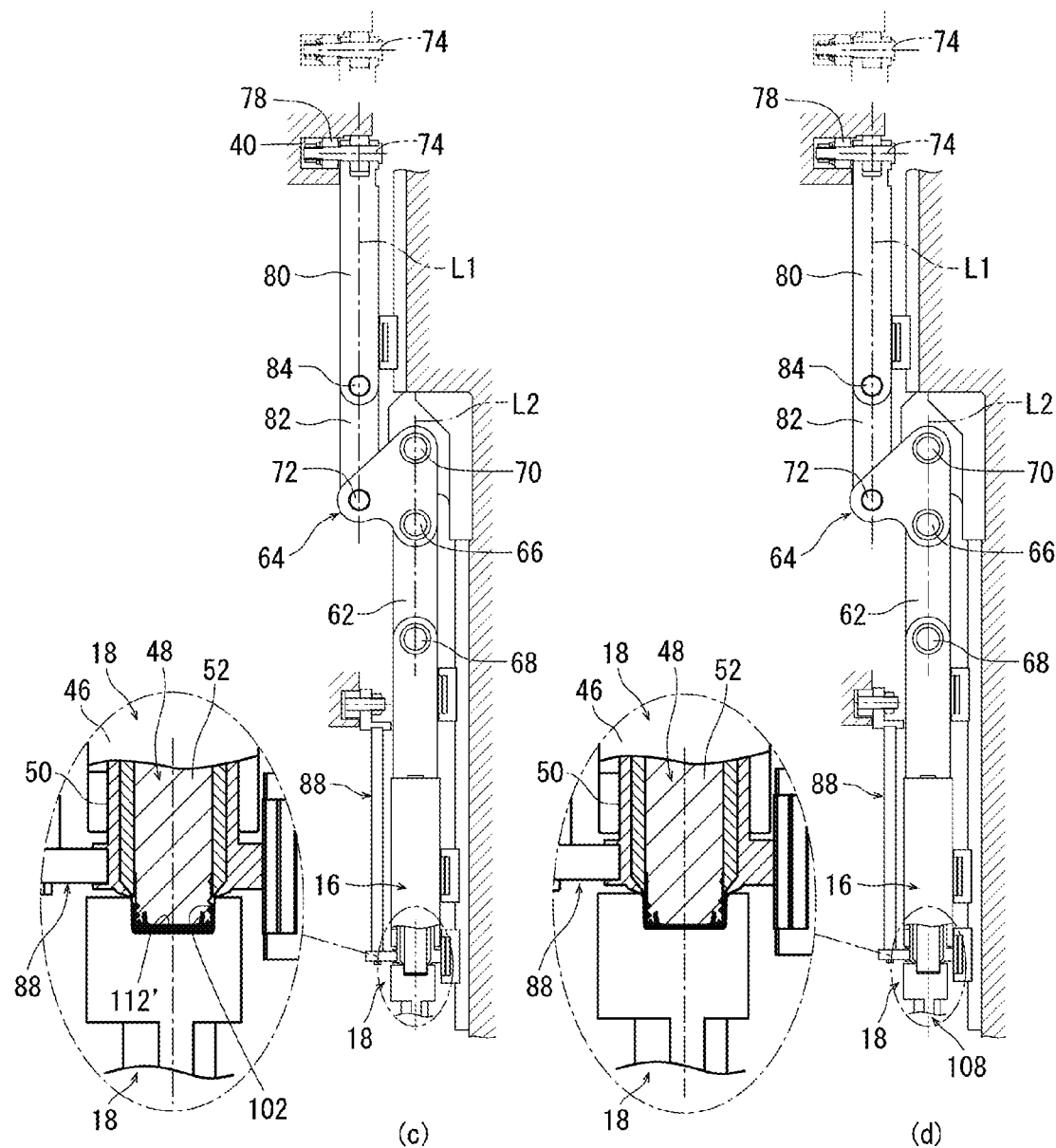
Figures 3, 4:
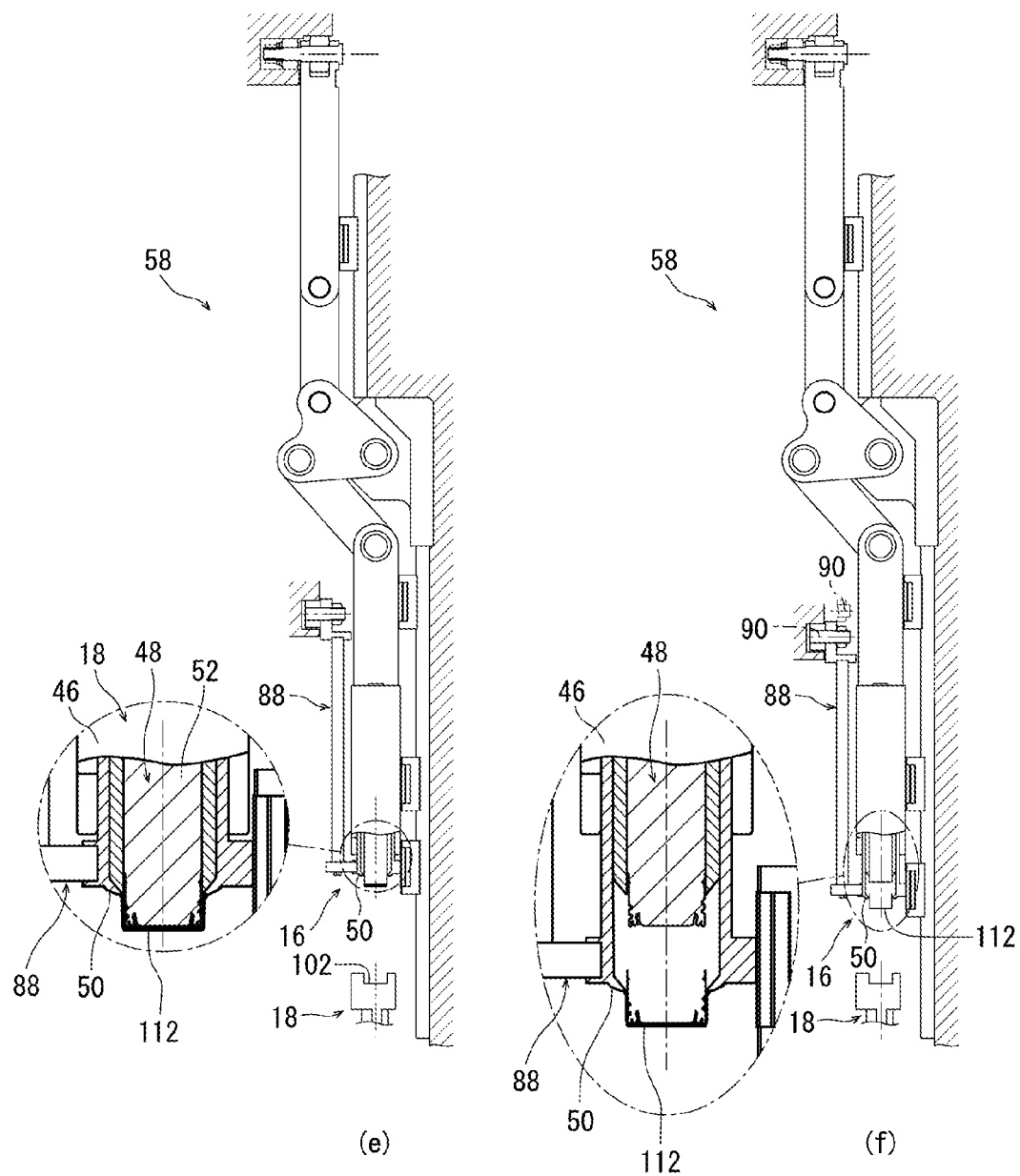

The one-side mold assembly 16 can be vertically moved by a one-side mold assembly moving means 58, which is attached thereto, between an ascent position shown in FIGS. 4-1(a), 4-3(e) and 4-3(f) and a descent position shown in FIGS. 4-2(c) and 4-2(d). Further referring to FIG. 3, the one-side mold assembly moving means 58 includes a toggle link mechanism including two links 62 and 64, and a toggle link mechanism operating means 60. The link 62 is in a rectilinear form extending longitudinally, while the link 64 is in a substantially triangular shape having three tops (these tops are denoted as 64a to 64c), and a longitudinally end part of the link 62 and the top 64a of the link 64 are connected together via a movable joint 66. A longitudinally opposite end part of the link 62 is connected to the one-side mold assembly 16 (in detail, an upper end part of its casing 46) via a movable joint 68. The top 64b of the link 64 is connected to the relay member 26 via the fixed joint 70, while the top 64c is connected to the toggle link mechanism operating means 60 (in detail, a longitudinally opposite end part of a lower driven link 82) via a movable joint 72. The toggle link mechanism operating means 60 is composed of a cam following link mechanism (an upper driven link 80 to be described later, and the lower driven link 82) having a cam follower 74 at one end and having the other end connected to the toggle link mechanism, and the stationary cam 40 (also see FIG. 2) collaborating with the cam following link mechanism. The cam follower 74 is provided coaxially with the cam roller 78 disposed in the stationary cam 40 such as the rail groove. When the cam roller 78 is circumferentially moved along the stationary cam 40, the cam follower 74 upon collaboration between the cam roller 78 and the stationary cam 40 is moved vertically, as required, between an ascent position and a descent position (in upper parts of FIGS. 4-1(b) to 4-2(d), the ascent position of the cam follower 74 is indicated by dashed double-dotted lines). The cam following link mechanism is composed of two links, the upper driven link 80 and the lower driven link 82. The upper driven link 80 and the lower driven link 82 are each a longitudinally extending rectilinear form, and a longitudinally opposite end part of the upper driven link 80 and a longitudinally end part of the lower driven link 82 are connected together via a movable joint 84. The longitudinally end part of the upper driven link 80 is connected to the cam roller 78 via the cam follower 74, while the longitudinally opposite end part of the lower driven link 82 is connected to the link 64 of the toggle link mechanism via the movable joint 72. Onto the upper driven link 80, a link guide 86 collaborating with the rail 30 attached to the upper portion 20 of the rotating support 6 is secured. Like the casing guide 56, the link guide 86 grips the rail 30, and is vertically movable along the rail 30, but its diametrical movement is restrained. Thus, the upper driven link 80 becomes movable only in the vertical direction while maintaining its posture along the central axis 4.

The operations of the one-side mold assembly 16 and the one-side mold assembly moving means 58 will be described mainly by reference to FIGS. 4-1(a), 4-1(b) and 4-2(c), 4-2(d). As will be shown in FIG. 4-1(a), when the cam follower 74 lies at the ascent position upon collaboration between the stationary cam 40 and the cam roller 78, the one-side mold assembly 16 is located at its ascent position. On this occasion, the two links, upper driven link 80 and lower driven link 82, constituting the cam following link mechanism are placed in a rectilinear form along the central axis 4, whereas the two links 62 and 64 constituting the toggle link mechanism are bent in a doglegged shape with the movable joint 66 as an inflection point. Here, the expression, "the links 62 and 64 are bent," means that a line connecting together the fixed joint 70, the movable joint 66 and the movable joint 68 (the line indicated by a dashed dotted line), the joints of the toggle link mechanism, is bent. When the cam follower 74 is lowered from the ascent position by collaboration between the stationary cam 40 and the cam roller 78, the upper driven link 80 is made to descend while maintaining the posture along the central axis 4 in the aforementioned manner, as shown in FIG. 4-1(b). At this time, the nearly rectangular link 64 is pivotable about the fixed joint 70 as an axis, and is connected to the lower driven link 82 and the link 62 via the movable joints 72 and 66, respectively. Furthermore, the one-side mold assembly 16 connected to the link 62 via the movable joint 68 is movable while maintaining the posture along the central axis 4, as stated above. When the upper driven link 80 descends, therefore, the lower driven link 82, the link 64 and the link 62 each serve as a crank mechanism, and lower the one-side mold assembly 16 while each pivoting as appropriate. When the cam follower 74 arrives at its descent position upon collaboration between the stationary cam 40 and the cam roller 78, the one-side mold assembly 16 also arrives at its descent position, as shown in FIG. 4-2(c). On this occasion, the two links, upper driven link 80 and lower driven link 82, constituting the cam following link mechanism are brought onto a straight line, and the two links 62 and 64 constituting the toggle link mechanism are also positioned on a straight line. Here, the state in which the links 62 and 64 are positioned on a straight line refers to a configuration in which the fixed joint 70, movable joint 66 and movable joint 68, the joints of the toggle link mechanism, are located in a rectilinear form. The upper driven link 80 and the lower driven link 82 located on a straight line in the cam following link mechanism, and the links 62 and 64 located on a straight line in the toggle link mechanism deviate from each other. That is, a straight line L1 (shown as a dashed dotted line) passing through the cam follower 74, the movable joint 84 and the movable joint 72, and a straight line L2 (shown as a dashed dotted line) passing through the fixed joint 70, the movable joint 66 and the movable joint 68 deviate from each other in a diametrical direction. The operation for raising the one-side mold assembly 16 from the descent position to the ascent position by the one-side mold assembly moving means 58 is the reverse of the above-mentioned operation for lowering the one-side mold assembly 16, and thus a detailed description of the former operation will be omitted.

Next, the operation of the stripper 50 will be described. The stripper 50 basically moves integrally with the casing 46 and the core 48, but when a compression-molded article is to be released from the core 48, the stripper 50 is moved downward with respect to the casing 46 and the core 48 by a stripper operating means 88. Referring to FIG. 3 again, the stripper operating means 88 is a cam following mechanism having a cam follower 90, and a fixed-length rod 92 having a lower end connected to a lower end part of the stripper 50. The cam follower 90 is provided coaxially with the cam roller 94 disposed in the stationary cam 42 such as a rail. When the cam roller 94 is circumferentially moved along the stationary cam 42, the cam follower 90 is moved vertically as required upon collaboration between the cam roller 94 and the stationary cam 42. The upper end of the fixed-length rod 92 is connected to the cam roller 94 via the cam follower 90. Thus, the vertical movement of the cam follower 90 upon collaboration between the stationary cam 42 and the cam roller 94 allows the stripper 50 to become vertically movable via the fixed-length rod 92 between a relatively raised position shown in FIG. 4-1(a) or 4-3(e) and a relatively lowered position shown in FIG. 4-3(f) with respect to the core 48 (in FIG. 4-3(f), the cam follower 74 when the stripper 50 lies at the relatively raised position is indicated as a dashed double-dotted line, and the cam follower 74 when the stripper 50 lies at the relatively lowered position is indicated as a solid line). As viewed in the vertical direction, when the stripper 50 is at the relatively raised position, the lower end of the stripper 50 is located between the lower end of the inner core 52 and the lower end of the outer core 54, and when the stripper 50 is at the relatively lowered position, the lower end of the stripper 50 is located below beyond the lower end of the inner core 52. To a lower end part of the stripper 50, a stripper guide 98 for gripping the rail 32 attached to the lower portion 22 of the rotating support 6 is secured. Like the casing guide 56, the stripper guide 98 grips the rail 32, and is vertically movable along the rail 32, but its diametrical movement is restrained. Thus, the stripper 50 becomes stably movable in the vertical direction along the central axis 4.

Mainly referring to FIG. 3, the opposite-side mold assembly 18 is equipped with a core receiving member 100 which constitutes a female mold when performing compression molding. An upper surface of the core receiving member 100 has a cavity 102 formed for accepting a lower end part of the inner core 52 disposed in the one-side mold assembly 16. A flow path 104 surrounding the cavity 102 is embedded in the core receiving member 100, and a suitable cooling means 106 is connected to the flow path 104 to cool the entire core receiving member 100. The cooling means 106 may be a well-known pump type cooling water circulation device or the like. The opposite-side mold assembly 18 in this configuration becomes vertically movable between a descent position shown in FIGS. 4-1(a) to 4-3(f), except FIG. 4-2(d), and an ascent position shown in FIG. 4-2(d), by an opposite-side mold assembly moving means 108 attached to the opposite-side mold assembly 18. The moving distance of the opposite-side mold assembly 18 imparted by the opposite-side mold assembly moving means 108 is smaller than the moving distance of the one-side mold assembly 16 imparted by the one-side mold assembly moving means 58. In other words, the vertical distance of travel of the core 48 from the ascent position shown in FIG. 4-1(a) to the descent position shown in FIG. 4-2(c) or 4-2(d) is greater than the vertical distance of travel of the cavity 102. In the illustrated embodiment, the distance between the descent position and the ascent position of the opposite-side mold assembly 18 is much smaller than the distance between the ascent position and the descent position of the one-side mold assembly 16. In the drawings, the descent position and the ascent position of the opposite-side mold assembly 18 are expressed as substantially the same position.

The opposite-side mold assembly moving means 108 includes a hydraulic cylinder mechanism. Such a hydraulic cylinder mechanism may be a well-known one and, in the illustrated embodiment, is composed of a vertically extensible hydraulic cylinder 108a and a hydraulic pressure generator 108b. The core receiving member 100, namely, the opposite-side mold assembly 18 is secured to the upper end of the hydraulic cylinder 108a, and is vertically moved by the expansion and contraction of the hydraulic cylinder 108a by the hydraulic pressure generator 108b. In the illustrated embodiment, the opposite-side mold assembly 18 is disposed below the one-side mold assembly 16, and the opposite-side mold assembly moving means 108 is disposed below the opposite-side mold assembly 18. The opposite-side mold assembly moving means 108 including the hydraulic cylinder mechanism is thus disposed below the one-side mold assembly 16 and the opposite-side mold assembly 18. Should oil leak from the hydraulic cylinder, therefore, neither the one-side mold assembly 16 nor the opposite-side mold assembly 18 would be contaminated by the leaking oil.

Next, the outlines of the compression molding process of the compression molding device 2 according to the present invention will now be described further concretely by referring mainly to FIGS. 4-1(a) to 4-3(f). When the molding means 14 is moved into the synthetic resin material supply region A, the one-side mold assembly 16 is raised by the one-side mold assembly moving means 58 and brought to the ascent position. The stripper 50 is also raised by the stripper operating means 88 and brought to the relatively raised position. The opposite-side mold assembly 18 is lowered by the opposite-side mold assembly moving means 108 and brought to the descent position. Thus, the one-side mold assembly 16 and the opposite-side mold assembly 18 are separated from each other to a maximum, falling into the open state shown in FIG. 4-1(a). The synthetic resin material 110 is supplied from the synthetic resin material supply means 10 into the cavity 102 of the opposite-side mold assembly 18.

By reference to the drawings along with FIG. 1, while the molding means 14 is passing through the molding region B, the one-side mold assembly 16 and the opposite-side mold assembly 18 are brought out of the open state shown in FIG. 4-1(a), and entered into the states shown in FIGS. 4-1(b) and 4-2(c), and then into the closed state shown in FIG. 4-2(d). On this occasion, the one-side mold assembly 16 is first moved toward the opposite-side mold assembly 18 by the one-side mold assembly moving means 58 (FIG. 4-1(b)), whereby the one-side mold assembly 16 and the opposite-side mold assembly 18 are brought close to each other up to a state closely resembling the closed state to establish a nearly closed state (FIG. 4-2(c)). In the illustrated embodiment, the one-side mold assembly 16 is lowered from the ascent position to the descent position by the toggle link mechanism and the cam following link mechanism, whereby the nearly closed state is established. At this time, the stripper 50 is lowered by the stripper operating means 88 integrally with the casing 46 and the core 48 while maintaining the relatively raised position. When the nearly closed state is established between the one-side mold assembly 16 and the opposite-side mold assembly 18, the inner core 52 of the one-side mold assembly 16 is accepted into the cavity 102 of the opposite-side mold assembly 18, as shown in a partially enlarged view of FIG. 4-2(c), so that the synthetic resin material 110 is semimolded (such a semimolded product is indicated at a numeral 112'). Then, the opposite-side mold assembly 18 is moved toward the one-side mold assembly 16 by the opposite-side mold assembly moving means 108 to establish the closed state (FIG. 4-2(d)). In the illustrated embodiment, the opposite-side mold assembly 18 is raised from the descent position to the ascent position by the hydraulic cylinder mechanism 106, whereby the closed state is established. Since the moving distance of the opposite-side mold assembly 18 during a period from the nearly closed state until establishment of the closed state is slight, there is little change in the vertical position of the opposite-side mold assembly 18 between FIG. 4-2(c) and FIG. 4-2(d). When the closed state is established between the one-side mold assembly 16 and the opposite-side mold assembly 18, the synthetic resin material 110 is finally molded, as shown in FIG. 4-2(d). If desired, it is permissible that the synthetic resin material 110 is not semimolded in the nearly closed state, but is finally molded in the closed state.

According to the compression molding device of the present invention, when the one-side mold assembly 16 and the opposite-side mold assembly 18 are to be brought from the open state into the closed state, the one-side mold assembly 16 is first moved toward the opposite-side mold assembly 18 by the one-side mold assembly moving means 58 to establish the nearly closed state. Then, the opposite-side mold assembly 18 is moved toward the one-side mold assembly 16 by the opposite-side mold assembly moving means 108 to establish the closed state. The one-side mold assembly moving means 58 includes the toggle link mechanism, and the one-side mold assembly 16 is moved by the toggle link mechanism. Thus, the one-side mold assembly 16 can be promptly moved from the open state to the nearly closed state. On the other hand, the opposite-side mold assembly moving means 108 includes the hydraulic cylinder mechanism, and the opposite-side mold assembly 18 is moved by the hydraulic cylinder mechanism. When the opposite-side mold assembly 18 moves to establish the closed state (the state of FIG. 4-2(*d*)) from the nearly closed state, therefore, a strong compression molding force can be generated. Hence, the compression molding device of the present invention makes it possible to obtain a great compression molding force without lowering the efficiency of article production.

According to the compression molding device of the present invention, moreover, in the nearly closed state and the closed state, the two links 62 and 64 constituting the toggle link mechanism are located on a straight line, so that the toggle link mechanism and the toggle link mechanism operating means 60 are not located on the same straight line. Thus, the great compression molding force exerted by the opposite-side mold assembly moving means 108 is transmitted to the toggle link mechanism via the opposite-side mold assembly 18 and the one-side mold assembly 16, but is not transmitted to the toggle link mechanism operating means 60. Consequently, the service life of the moving means 14 can be lengthened.

While the molding means 14 is passing through the cooling region C, the one-side mold assembly 16 and the opposite-side mold assembly 18 are not moved relative to each other, but are held in the compression-molding state. During this passage, cooling of the compression-molded synthetic resin container lid 112 is performed.

While the molding means 14 is being moved from the downstream end of the cooling region C toward the molded article discharge region D, the one-side mold assembly 16 and the opposite-side mold assembly 18 are brought from the closed state to the open state (FIG. 4-3(*e*)). That is, the one-side mold assembly 16 is raised from the descent position to the ascent position by the one-side mold assembly moving means 58, while the opposite-side mold assembly 18 is lowered from the ascent position to the descent position by the opposite-side mold assembly moving means 108. On this occasion as well, the stripper 50 is raised by the stripper operating means 88 integrally with the casing 46 and the core 48, and the stripper 50 remains at the relatively raised position. By so doing, the synthetic resin container lid 112 is released from the cavity 102, and the compression-molded synthetic resin container lid 112 is held by the core 48.

When the molding means 14 is moved to the molded article discharge region D, the stripper 50 is lowered by the stripper operating means 88 from the relatively raised position to the relatively lowered position, with the one-side mold assembly 16 being kept at the ascent position (FIG. 4-3(*f*)). At this time, the stripper 50 acts on the synthetic resin container lid 112. As a result, the synthetic resin container lid 112 is forcibly extracted from the core 48, released therefrom, and freely fallen. Besides, the synthetic resin container lid 112 is forcedly moved to the carry-out chute 12*b* by air ejected from the air ejection pipe 12*a*, whereby its carry-out is completed.

The above-described compression molding process (cycle) is repeatedly performed by each molding means 14, so that the synthetic resin container lid 112 is continuously compression-molded.

The compression molding device of the present invention has been described in detail above by reference to the accompanying drawings. However, the present invention is in no way limited to the foregoing embodiment, and can be modified, as appropriate, within the scope of the present invention. In the above embodiment, for example, the toggle link mechanism operating means is composed of the cam following link mechanism and the stationary cam. Instead, however, direct operation may be performed using a suitable drive source such as an electric motor. In the above-mentioned embodiment, moreover, the plurality of molding means are mounted on the rotating support, and the respective molding means continuously mold container lids while rotating about the central axis. However, a single fixed molding means may be configured to mold container lids repeatedly.

EXPLANATIONS OF LETTERS OR NUMERALS
s

2: Compression molding device
4: Central axis
6: Rotating support
14: Molding means
16: One-side mold assembly
18: Opposite-side mold assembly
40, 42: Stationary cam
58: One-side mold assembly moving means
62, 64: Link (toggle link mechanism)
60: Toggle link mechanism operating means
76: Cam following link mechanism
108: Opposite-side mold assembly moving means (hydraulic cylinder mechanism)
106: Hydraulic cylinder mechanism
110: Synthetic resin material
112: Synthetic resin container lid

The invention claimed is:

1. A compression molding device comprising:
a plurality of molding means each comprising a one-side mold assembly and an opposite-side mold assembly, the one-side mold assembly and the opposite-side mold assembly being free to move toward and away from each other between a closed state where the one-side mold assembly and the opposite-side mold assembly collaboratively compression-mold an article, and an open state where the one-side mold assembly and the opposite-side mold assembly are located apart from each other; and
a rotating support to be rotationally driven, the plurality of molding means being mounted to the rotating support at circumferential intervals,
wherein, for each the plurality of molding means,
the one-side mold assembly has one-side mold assembly moving means attached thereto,
the opposite-side mold assembly has opposite-side mold assembly moving means attached thereto,
the one-side mold assembly moving means includes a toggle link mechanism including two links, and toggle link mechanism operating means including a cam following link mechanism having a plurality of links,
the opposite-side mold assembly moving means includes a hydraulic cylinder mechanism, and
when the one-side mold assembly and the opposite-side mold assembly are to be brought from the open state into the closed state:
the one-side mold assembly is first moved toward the opposite-side mold assembly by the one-side mold assembly moving means, whereby the one-side mold assembly and the opposite-side mold assembly are brought close to a state proximate to the closed state to establish a nearly closed state, so that the two links of the toggle link mechanism in the one-side mold assembly moving means are located on a straight line; and the opposite-side mold assembly is then moved toward the one-side mold assembly by the opposite-side mold assembly moving means to establish the closed state, whereupon a compression molding force exerted by the opposite-side mold assembly moving means is transmitted to the toggle link mechanism via the opposite-side mold assembly and the one-side mold assembly, but is not transmitted to the toggle link mechanism operating means, wherein, in the nearly closed state and the closed state, the plurality of links of the cam following link mechanism are located on a first line, and the two links of the toggle link mechanism are located on a second line, the first and second lines deviating from each other in a diametrical direction.

2. The compression molding device according to claim 1, wherein a moving distance of the one-side mold assembly imparted by the one-side mold assembly moving means is greater than a moving distance of the opposite-side mold assembly imparted by the opposite-side mold assembly moving means.

3. The compression molding device according to claim 1, wherein the cam following link mechanism also has a cam follower at an end and having an opposite end connected to the toggle link mechanism, and the toggle link mechanism operating means also includes a stationary cam collaborating with the cam following link mechanism.

4. The compression molding device according to claim 1, wherein the rotating support is rotationally driven about a central axis extending vertically, and the one-side mold assembly and the opposite-side mold assembly are free to move in a vertical direction.

5. The compression molding device according to claim 3, wherein the rotating support is rotationally driven about a central axis extending vertically, and the one-side mold assembly and the opposite-side mold assembly are free to move in a vertical direction.

6. The compression molding device according to claim 2, wherein the rotating support is rotationally driven about a central axis extending vertically, and the one-side mold assembly and the opposite-side mold assembly are free to move in a vertical direction.

\* \* \* \* \*